June 27, 1944.                R. E. SEARS                    2,352,499
                ELECTRICAL TESTING APPARATUS AND METHOD
                    Filed April 19, 1941        2 Sheets-Sheet 1
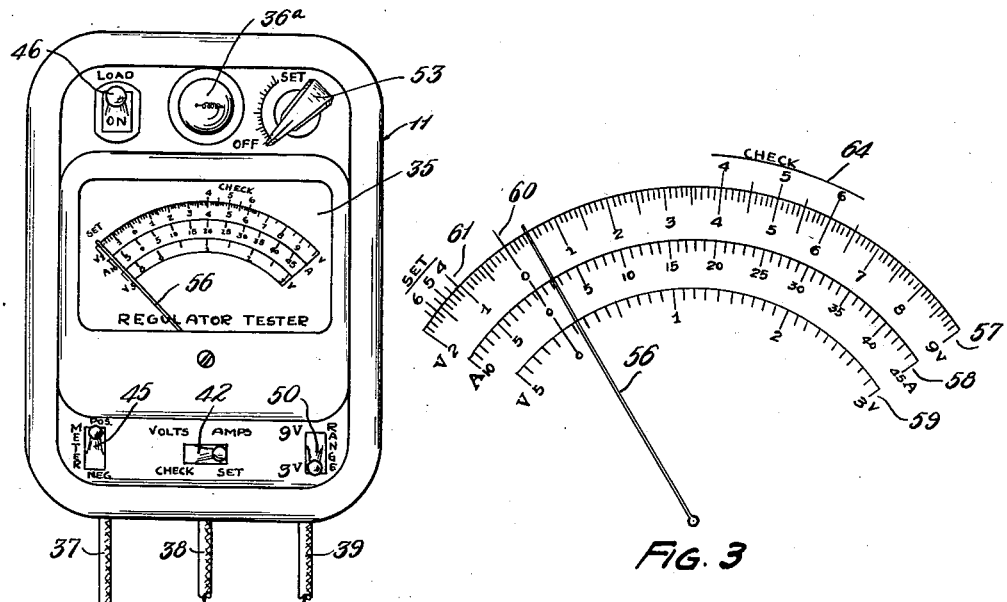
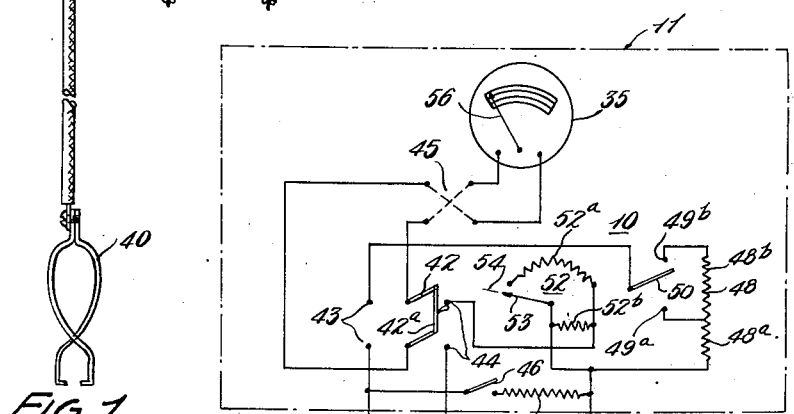
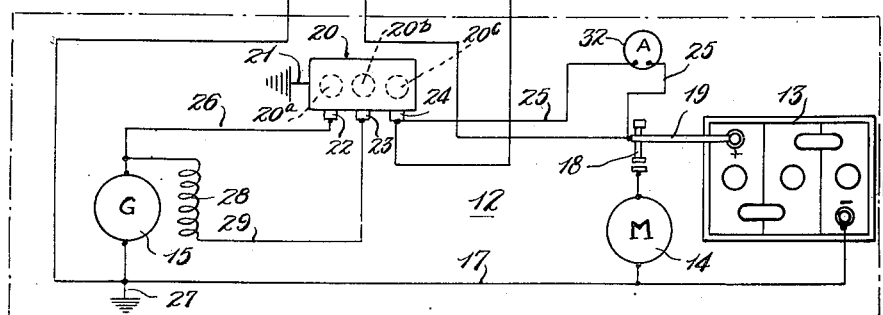
INVENTOR.
RICHARD E. SEARS
BY Kwis, Hudson & Kent
ATTORNEYS Patented June 27, 1944

2,352,499

UNITED STATES PATENT OFFICE 2,352,499

ELECTRICAL TESTING APPARATUS AND METHOD

Richard E. Sears, Cleveland, Ohio, assignor to Willard Storage Battery Company, Cleveland, Ohio, a corporation of West Virginia Application April 19, 1941, Serial No. 389,402

3 Claims. (Cl. 175—183)

This invention relates to electrical testing apparatus of the type used in testing the various auxiliary devices and circuits embodied in motor vehicle electrical systems, and as its principal object aims to provide improved testing apparatus of this character which is less expensive than similar apparatus heretofore provided and which is more simplified, both from the standpoint of manufacture and operation.

Another object of my invention is to provide improved electrical testing apparatus with which any portion of a motor vehicle electrical system can be tested without removing or breaking any of the existing connections of the system.

A further object of my invention is to provide improved testing apparatus of this character embodying a meter and a load resistance of a known value, and having switch means and a plurality of leads whereby the load resistance and the meter can be connected with the system in a manner such that the meter readings will represent the current flow in any part of the system desired to be tested.

Other objects and advantages of my invention will be apparent from the following description when taken in conjunction with the accompanying sheets of drawings in which:

Fig. 1 is a plan view showing my improved testing apparatus in the form of a self-contained unit;

Fig. 2 is a wiring diagram representing my testing unit and the electrical system of a motor vehicle and showing the testing unit connected to the system;

Fig. 3 is a view representing the scales of the meter embodied in my testing apparatus;

Figure 4:
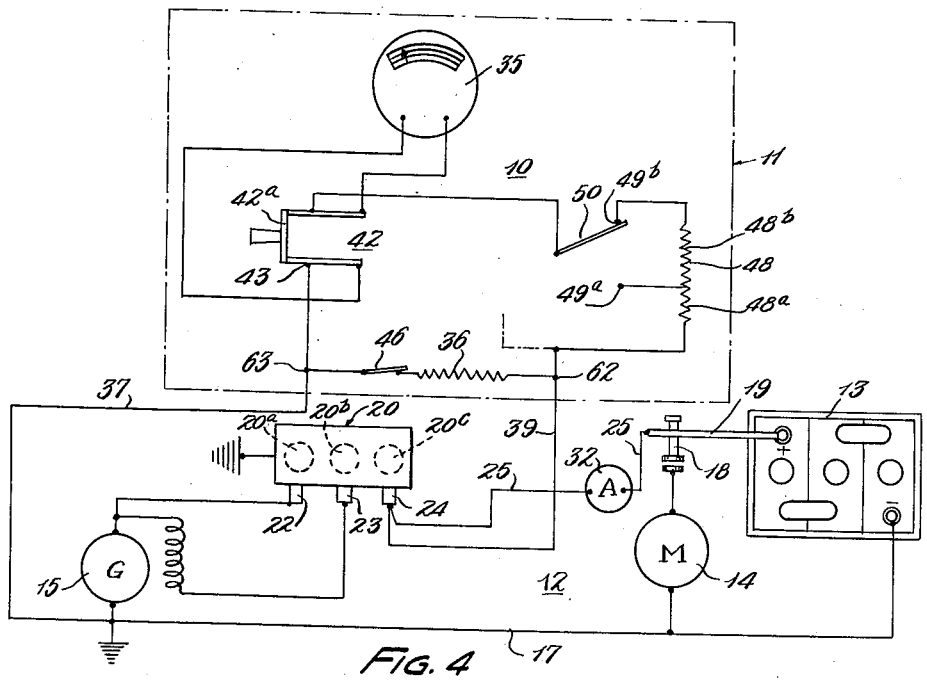
Fig. 4 is a simplified wiring diagram showing the connections between my testing apparatus and the motor vehicle system as used in the first step of the testing operation.

More detailed reference will now be made to the drawings for the purpose of describing one embodiment of my testing apparatus and illustrating the manner of using the same in connection with the electrical system of a motor vehicle. Although I have shown but one embodiment of my testing apparatus, it will be understood, of course, that the invention is not to be regarded as limited to this particular embodiment since it is susceptible of various other arrangements and uses.

In Figs. 1 and 2 of the drawings I show my improved testing apparatus 10 in the form of a self-contained unit 11 which can be conveniently handled or transported for use in testing the various circuits and auxiliary devices embodied in a motor vehicle electrical system. In Fig. 2 I show the testing unit 11 hooked up to the electrical system 12 of an automobile or other motor vehicle.

Before proceeding with the description of the testing apparatus 10, I wish to describe briefly a typical motor vehicle electrical system with which this testing apparatus is intended to be used. The electrical system 12 shown in Fig. 2 represents such a typical motor vehicle electrical system and comprises in general a storage battery 13, a starting motor 14 and a generator 15 arranged to be driven by the vehicle engine. One terminal of the battery 13 may be grounded on the vehicle or, as here illustrated, may be connected with one terminal each of the motor and the generator by the conductor 17. The other terminal of the battery 13 may be connected with a starting switch 18 by means of the heavy conductor 19.

The system 12 may also include a regulator and cut-out unit 20 having a ground connection 21 and a plurality of terminals 22, 23 and 24. This unit may be connected with the starter switch 18 by means of the conductor 25 and with one side of the generator 15 by the conductor 26. The unit 20 may be connected with the other side of the generator by a common conductor, or preferably as shown in this instance, by means of the ground connection 21 and a second ground connection 27 adjacent the generator. As will be understood by those skilled in this art, the unit 20 may embody several auxiliary devices of well known construction and use, and in this instance the unit contains a reverse current cut-out 20a, a voltage regulator 20b, and a current regulator 20c. The generator 15 may have one end of the shunt field 28 thereof connected with the unit 20 by the conductor 29. In addition to the devices above mentioned, the system 12 may also include an ammeter 32 in the portion of the load circuit represented by the conductor 25 and may be the ammeter usually found on the dashboard or instrument panel of motor vehicles.

Reverting now to the testing apparatus 10, I have shown this apparatus in Figs. 1 and 2 as embodying a meter 35 and a load resistance 36, and as also having three leads 37, 38 and 39 by which the testing unit can be connected with the system 12. These leads are preferably of low resistance, and for convenience in making connections with different points of the system 12, may be provided at their outer ends with suitable clips 40 which are also of low resistance as by being made of copper. Although Fig. 2 shows the leads 37, 38 and 39 as being of considerable length, it will be understood, of course, that this is merely incidental to a clear illustration of the circuits and that in the actual testing unit these leads are made as short as is consistent with the convenient handling and use of the device.

In addition to the meter 35 and the load resistance 36, to which further reference will presently be made, the testing apparatus 10 embodies control means comprising certain switches and resistance devices which will now be described. These switches include a main control switch 42 for controlling the connections between the meter 35 and the system 12. As shown in Fig. 2, the switch 42 may be a double-pole double-throw switch having a movable switch member 42a and pairs of terminals 43 and 44. The control switches of the apparatus 10 may also include a reversing switch 45 for reversing the connections to the meter 35 and a switch 46 in the circuit of the load resistance 36.

As mentioned above, my testing apparatus embodies certain resistance devices and these may include a "multiplier" resistance or rheostat 48 for varying the characteristics of the meter 35 so as to shift from one meter scale or series of graduations to another. This rheostat may be composed of sections 48a and 48b having contacts or taps 49a and 49b with either of which the movable switch member 50 may be brought into engagement for selecting the corresponding scale of the meter 35.

The resistance devices may also include an adjusting resistance or rheostat 52 by which the meter 35 can be calibrated when the proper connections with the system 12 have been established. The rheostat 52 includes a movable contact or switch arm 53 having an "off" or "open" position 54 and being movable along the resistance element 52a to vary the resistance of the meter circuit. The rheostat 52 may also include a protective resistor 52b which remains in the meter circuit at all times to protect the meter coil.

The meter 35 is preferably of the moving coil or D'Arsonval type having a movable pointer 56 adapted to swing over a plurality of graduated arcuate scales 57, 58 and 59. Although any electrical testing meter of appropriate characteristics can be used in my testing apparatus, I find that a milliammeter used in connection with the "multiplier" 48 serves very well. The scales of the meter 35, as shown in Fig. 3, may comprise a 9-volt voltage scale 57 on which readings are taken when the switch member 50 is in engagement with the contact or tap 49b and a 3-volt voltage scale 59 on which readings are taken when the switch member 50 is in engagement with the contact or tap 49a. The intermediate scale 58 is an ampere scale on which current readings are taken, as will be explained hereinafter.

All three of the scales 57, 58 and 59 may be extended to the negative or left-hand side of the zero position 60 and although this is done primarily for calibrating purposes, limited readings of low value are possible on either side of the zero position. A portion of the voltage scale 57 on the left-hand side of the zero line 60 has current graduations 61 superposed thereon and designated or identified by the word "set." Another section of the voltage scale 57 lying to the right of the zero line 60 is designated or identified by the word "check." These portions of the voltage scale are used in calibrating the meter to the portion or section of the system 12 being tested, as will be later explained in detail. The markings of the "set" scale section 61 represent current values which have been computed for various voltage values measured across the load resistance 36, but the numerals appearing on this scale section do not actually indicate the number of amperes but instead correspond to the voltage values which are the equivalent of the load resistance values.

The load resistance 36 should have a relatively low ohmic value and for the testing of motor vehicle electrical systems of the type here under consideration, the value of this resistance should be on the order of three-fourths of an ohm. This resistance may be made of resistance wire, or preferably may be an incandescent lamp 36a as shown in Fig. 1. The advantage of using an incandescent lamp for this resistance is that it provides a ballast effect and automatically compensates for variations in the voltage of the battery 13 because when the voltage of the battery is high the resistance of the lamp will be relatively higher, and conversely when the voltage of the battery is low the resistance of the lamp will be relatively lower.

Before describing in detail the manner of using the testing apparatus 10, it should, perhaps, be explained that one of the main uses of this apparatus is to determined or measure the current flowing in a given section of the system 12 while the system is in operation. Speaking in general terms, this is accomplished by first connecting the load resistance 36 into the system 12 in series with the portion thereof to be tested, in this instance the main conductor 25, and measuring the voltage drop across the load resistance by means of the meter 35 to thereby obtain an indication of the value of the current flowing through said selected portion while the vehicle engine is either stopped or operating at a relatively low speed such that the reverse current cut-out 20a remains open. The meter is next connected across the selected portion of the system, with the latter serving as a shunt for the meter, and the meter is then calibrated to this shunt by using the current value previously obtained in measuring the voltage drop across the load resistance 36. When the meter has been thus calibrated to the selected portion of the system 12, the system is put into operation by running the vehicle engine and the current readings then given by the meter 35 will represent the values of the current flowing in the selected portion of the system.

Figure 5:
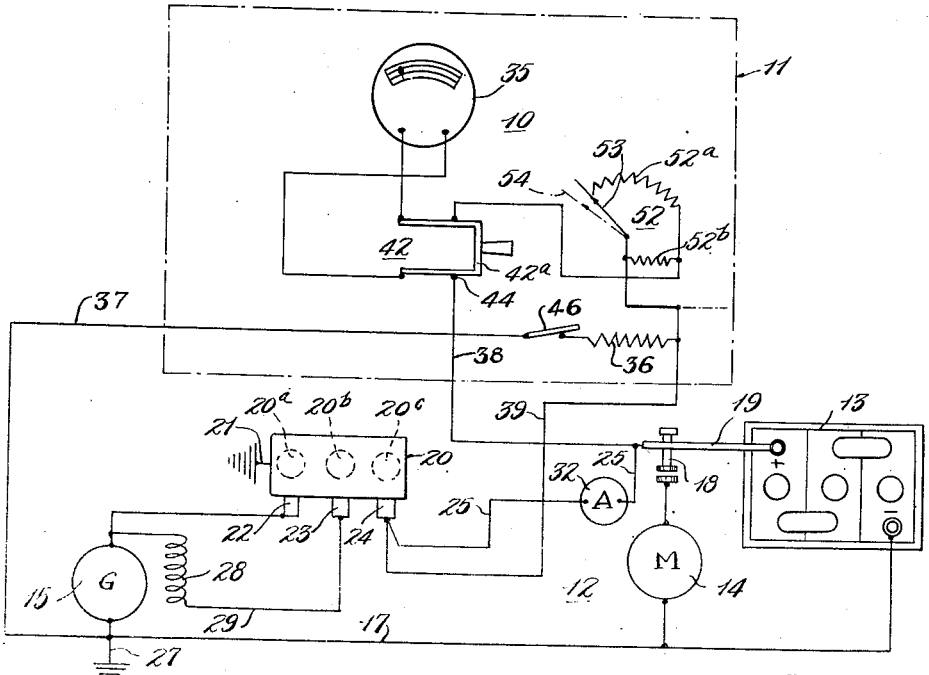
Fig. 5 is another simplified wiring diagram showing the connections between the testing apparatus and the system for the second step of the testing operation.

To describe this testing operation in greater detail and by reference to wiring diagrams, I have found it convenient to make use of the diagrams shown in Figs. 4 and 5 of the drawings. Fig. 4 illustrates the circuit connections in use when the load resistance 36 has been connected into the system 12 and the meter 35 has been connected across the resistance 36 to measure the voltage drop thereof. Fig. 5 illustrates the circiut connections in use when the meter 35 has been connected across the selected portion of the system 12, preparatory to calibrating the meter to such selected portion as a shunt, and for thereafter reading on the meter the values of the current flowing through such selected portion.

Assuming now that we wish to measure the values of the current flowing in the portion of the system 12 represented by the main conductor 25 while the vehicle engine is being run at different speeds, we would hook up the testing unit 11 to the system so as to place the load resistance 36 in the system in series with this conductor. As will be seen from Figs. 2 and 4, this is done by connecting the lead 37 to the grounded side of the generator 15 and connecting the lead 39 with the terminal 24 of the cut-out and regulator unit 20. As a practical matter the operator may also attach the lead 38 to the starter switch 18 at the same time. These connections are made to the system while the vehicle engine, to which the generator 15 is connected is stopped or is operating at a relatively slow speed such that the reverse current cut-out 20a remains open. After the leads 37 and 38 have been thus connected, the switch 46 controlling the load resistance 36 is closed and the switch member 42a of the switch 42 is shifted into engagement with the terminals 43, or in other words, is shifted to its "voltage" position as shown in Fig. 4.

Current from the battery 13 will now flow through the conductors 19 and 25 and through lead 39 to the point 62. At this point the current will divide and some of it will flow through the multiplier 48 and the meter 35 to the point 63. The remaining portion of the current will flow through the load resistance 36. At the point 63 the two current branches will again unite and will flow back to the battery 13 through the lead 37 and the conductor 17. During this testing operation the meter 35 thus has been connected as a shunt across the load resistance 36 and the operator notes on the "check" section 64 of the scale 57 the voltage drop across the load resistance. From this voltage drop the operator can compute the ampere value of the current flowing through the load resistance 36 which obviously will also be the ampere value of the current flowing through the selected portion of the system 12, that is, through the conductor 25. The operator need not actually compute this current value because the meter scale, in effect, automatically makes an Ohm's law calculation for him. He does, however, note carefully the reading on the scale section 64 because, as will be presently explained, this is used in the next step of the testing operation in which the meter 35 is calibrated to the selected system portion being tested.

In the second step of the testing operation the lead 38 is connected to the starter switch 18 (usually this lead is connected to this point of the system 12 at the same time that the leads 37 and 39 are hooked up) and the main control switch 42 is shifted to the position with the switch member 42a in engagement with the terminals 44 as shown in Fig. 5 and which is conveniently referred to as its "ampere" position. The switch arm or contact member 53 of the rheostat 52 is then shifted from its "off" position 54 along the resistance element 52a to thereby vary the resistance of the meter circuit.

It will be observed at this time that the meter 35 is connected across the ends of the conductor 25, which is the system portion being tested, by means of the leads 38 and 39. In other words, the conductor 25 of the system 12 forms a shunt for the meter circuit. At this time the switch 46 is still closed so that current from the battery 13 will again flow through the conductor 25 and the load resistance 46 in series. In varying the position of the arm 53 of the rheostat 52 the operator calibrates the meter 35 to the shunt, or in other words, divides the flow of current between the meter circuit and the shunt in a given proportion. In thus calibrating the meter 35, the operator adjusts the position of the arm 53 until the reading of the meter on the scale 61 is the same as the voltage value previously determined for the voltage drop across the load resistance 36 as read on the scale 64. When this reading is obtained on the "set" section 61 of the meter scale the operator knows that the meter has been calibrated to the shunt. The switch 46 is now opened.

The system 12 is then placed in operation by running the engine of the vehicle at a speed above that at which the cut-out 20a closes so that current from the generator 15 will flow in the conductor 25. With the meter 35 hooked up and calibrated as above explained the readings given by the scale 58 during such operation of the system will represent the actual ampere values of the current flowing through the conductor 25 of the system. The engine can then be operated at different speeds and a series of readings can be taken from the meter 35 for these different engine speeds, and such readings will be the actual ampere values of the current flowing in the selected portion 25 of the system.

If desired the "set" section 61 of the scale could be located on the right-hand side of the zero line and in that case the operator would shift the switch 45 accordingly. However, to avoid confusion the "set" and "check" scale sections 61 and 64 are preferably located on opposite sides of the zero line.

My testing apparatus can be used in making a variety of other tests on the system 12. For example, it can be used to determine the amount of starting current used by the motor 14, or can be used to determine the operating voltage of the voltage regulator 20b, or can be used to test the reverse current cut-out 20a. By means of a test similar to that described above in detail my testing apparatus can also be used to determine the operating current of the current regulator 20c. It will be understood, of course, that for each of these tests the leads of the testing unit are applied or shifted to the appropriate points of the system.

From the accompanying drawings and the foregoing detailed description, it will now be readily seen that I have provided improved electrical testing apparatus by which any desired portion or auxiliary device of a motor vehicle electrical system can be tested without breaking or removing any of the connections of the system. It will be seen furthermore that my improved testing apparatus can be in the form of a self-contained portable unit which can be conveniently carried to the vehicle to be tested and can be quickly hooked up for the testing operation by simply applying the leads to the appropriate points of the system. Furthermore, it will be seen that by reason of the simplicity and compactness of my testing apparatus it is only necessary to manipulate certain switches on the unit after it has been hooked up to the system and to observe the readings of the meter in order to make the desired tests.

While I have illustrated and described my improved testing apparatus and the manner of using the same in considerable detail, it will be understood, of course, that I do not wish my invention to be limited to the details of the apparatus herein disclosed, but regard my invention as including such changes and modifications as do not constitute a departure from the spirit of the invention and the scope of the appended claims.

Having thus described my invention, I claim:

1. The method of testing motor vehicle electrical systems of the type embodying a storage battery and an engine-driven generator to ascertain the value of the current flowing in a selected portion of the system during operation thereof without breaking any of the connections of the system, comprising connecting a load of known resistance so as to be energized from the battery of the system in series with said selected portion, measuring the voltage drop across such load with a meter and determining the value of the current flow through said load, connecting the meter across said selected portion of the system and again energizing said resistance and selected portion in series from said battery and varying the resistance of the meter circuit to cause the meter to show a current reading of the value of the current flow previously determined through said load, and then operating said generator at variable speeds to cause a variable current from the generator to flow through said selected portion of the system with the ampere values of such variable current being indicated directly by said meter.

2. In apparatus for testing motor vehicle electrical systems of the type embodying a battery and an engine-driven generator to ascertain the value of the current flowing in a selected portion of the system during operation of said engine-driven generator without breaking any of the connections of the system, a meter, leads extending from said meter for connection with different points of said system, a load resistance connected across two of said leads, said leads being connected with said system so that said selected portion thereof and said load resistance are energized in series from said battery, switch means controlling said leads and operable to selectively connect the meter in a circuit with the meter shunted by said load resistance or in a different circuit in which the meter is shunted by said selected portion of the system, and variable means in the last mentioned meter circuit adapted to be adjusted to calibrate said meter such that the latter will indicate the current flow in said selected portion of the system when said selected portion is being energized by said generator.

3. In apparatus for testing motor vehicle electrical systems of the type embodying a battery and an engine-driven generator to ascertain the value of the current flowing in a selected portion of the system during operation of said engine-driven generator without breaking any of the connections of the system, a meter, leads extending from said meter for connection with different points of said system, a load resistance connected across two of said leads, said leads being connected with said system so that said selected portion thereof and said load resistance are energized in series from said battery, switch means controlling said leads and operable to selectively connect the meter in a circuit with the meter shunted by said load resistance or in a different circuit in which the meter is shunted by said selected portion of the system, variable means in the last mentioned meter circuit adapted to be adjusted to calibrate said meter such that the latter will indicate the current flow in said selected portion of the system when said selected portion is being energized by said generator, and a second switch for disconnecting said load resistance from said meter leads to remove said load resistance from the circuit containing said selected portion.

RICHARD E. SEARS.